(12) United States Patent
Lai et al.

(10) Patent No.: US 7,623,845 B2
(45) Date of Patent: Nov. 24, 2009

(54) SYSTEM FOR PREVENTING UNAUTHORIZED USE OF A MOBILE PHONE

(75) Inventors: Cheng-Shing Lai, Taipei (TW); Xiang-Lin Chu, Nankng (CN)

(73) Assignee: Inventec Appliances Corp., Taipei (TW)

( * ) Notice: Subject to any disclaimer, the term of this patent is extended or adjusted under 35 U.S.C. 154(b) by 953 days.

(21) Appl. No.: 11/133,387

(22) Filed: May 20, 2005

(65) Prior Publication Data

US 2006/0009196 A1 Jan. 12, 2006

(30) Foreign Application Priority Data

Jul. 9, 2004 (TW) .............................. 93120603 A

(51) Int. Cl.
*H04M 1/66* (2006.01)
(52) U.S. Cl. ...................... 455/411; 455/410; 455/41.2; 455/556.1; 455/558; 340/5.64
(58) Field of Classification Search ......... 455/410–411, 455/558, 41.2, 419, 556.1; 340/5.64
See application file for complete search history.

(56) References Cited

U.S. PATENT DOCUMENTS

| | | | | |
|---|---|---|---|---|
| 5,353,328 A * | 10/1994 | Jokimies | ...................... | 455/558 |
| 5,604,787 A * | 2/1997 | Kotzin et al. | ................. | 455/558 |
| 5,819,183 A * | 10/1998 | Voroba et al. | ................ | 455/570 |
| 5,821,854 A * | 10/1998 | Dorinski et al. | ........ | 340/539.21 |
| 5,933,773 A * | 8/1999 | Barvesten | .................... | 455/411 |
| 5,983,093 A * | 11/1999 | Haimi-Cohen | .............. | 455/411 |
| 5,986,565 A * | 11/1999 | Isaka | ......................... | 340/5.42 |
| 6,263,218 B1 * | 7/2001 | Kita | ............................ | 455/567 |
| 6,424,251 B1 * | 7/2002 | Byrne | ........................ | 340/7.58 |
| 6,424,845 B1 * | 7/2002 | Emmoft et al. | .......... | 455/575.1 |
| 6,483,929 B1 * | 11/2002 | Murakami et al. | .......... | 382/115 |
| 6,615,057 B1 * | 9/2003 | Pettersson | .................. | 455/558 |
| 6,657,538 B1 * | 12/2003 | Ritter | ........................ | 340/5.81 |
| 6,662,023 B1 * | 12/2003 | Helle | ......................... | 455/558 |
| 7,058,397 B2 * | 6/2006 | Ritter | ........................ | 455/419 |
| 7,146,191 B2 * | 12/2006 | Kerner et al. | ............... | 455/558 |
| 7,155,199 B2 * | 12/2006 | Zalewski et al. | ............ | 455/403 |
| 7,266,392 B2 * | 9/2007 | Wang et al. | .................. | 455/558 |
| 7,378,939 B2 * | 5/2008 | Sengupta et al. | ........... | 340/5.64 |
| 7,406,294 B1 * | 7/2008 | Liu | ........................... | 455/3.06 |
| 2001/0021640 A1 * | 9/2001 | Lappe | ......................... | 455/41 |
| 2002/0037745 A1 * | 3/2002 | Yahiro | ........................ | 455/557 |
| 2002/0190125 A1 * | 12/2002 | Stockhammer | ............. | 235/382 |
| 2003/0046228 A1 * | 3/2003 | Berney | ........................ | 705/41 |
| 2003/0119482 A1 * | 6/2003 | Girard | ........................ | 455/411 |
| 2003/0162529 A1 * | 8/2003 | Noblins | ....................... | 455/411 |

(Continued)

*Primary Examiner*—Sharad Rampuria
(74) *Attorney, Agent, or Firm*—Bacon & Thomas, PLLC

(57) ABSTRACT

The present invention is to provide a system for preventing unauthorized use of a mobile phone, which comprises a portable object having a radio frequency identification component installed therein and a mobile phone installed with a decoding module and an identification data, such that after the mobile phone is turned on, the radio frequency identification component and the mobile phone carry out the steps of sending out a radio signal from the decoding module; issuing an identifying data by the radio frequency identification component when being located in an effective range for receiving the radio signal; decrypting the identifying data by the decoding module after receiving the identifying data; and enabling the mobile phone to be used normally when the decrypted identifying data matches with the identification data.

9 Claims, 5 Drawing Sheets

U.S. PATENT DOCUMENTS

2004/0046638 A1* 3/2004 Kawasaki .................. 340/5.61
2004/0048605 A1* 3/2004 Schaefer et al. .......... 455/414.2
2004/0122685 A1* 6/2004 Bunce ........................... 705/1
2004/0159700 A1* 8/2004 Khan et al. .................. 235/380
2004/0185915 A1* 9/2004 Ihara et al. ................ 455/569.1
2004/0203351 A1* 10/2004 Shearer et al. ............. 455/41.1

* cited by examiner

SYSTEM FOR PREVENTING UNAUTHORIZED USE OF A MOBILE PHONE

FIELD OF THE INVENTION

The present invention relates to a mobile phone, more particularly to a mobile phone with a system for preventing unauthorized use, which is able to receive an identifying data produced by a radio frequency identification component installed in a portable object, and utilizes a decoding module in the mobile phone to decrypt the identifying data, enabling a user to use the mobile phone normally only when the identifying data is decrypted to be identical to an identification data installed in the mobile phone.

BACKGROUND OF THE INVENTION

Among all components of mobile phone in a prior art, a subscriber identity module card (SIM card) is considered to be the most important one. The way of reasonably using a SIM card is a key point of a mobile phone application.

Subscriber identity module card is actually a smart card having a large scale of integrated circuits, and the SIM card contains personal information of a Global System for Mobile Communication (GSM) user. Only with the installation of a SIM card, a mobile phone can be used; otherwise the mobile phone is only an "idle machine" which allows users to dial emergency calls such as the number 112 provided by telecommunication companies. If a SIM card is inserted into any GSM mobile phone, a phone call can be dialed, and the telephone fee will be billed to the cardholder automatically without the concern of which mobile phone is used to make the call. The SIM card is means of the encryption technology, which is used to store user's data, authentication software and authentication key for the Global System for Mobile Communication phone to identify a user. In the meantime, a user can use the SIM card for the connection and information exchange with the system.

In general, SIM cards are divided into 4 different types according to the type of data stored:

The first type stores fixed information, and such information is stored into a SIM card by the SIM center before a mobile phone is sold, and this information include International Mobile Subscriber Identity (IMSI), Authentication Key (KI), authentication software, and encryption algorithm, etc.

The second type stores temporary network related data including Local Area Identity (LAI), Temporary Mobile Scriber Identity (TMSI), and a public phone network code for prohibiting a connection.

The third type stores business related code including personal identification number (PIN), Personal Unblocking Key (PUK), and charge rate, etc.

The fourth type stores a telephone directory and allows a mobile phone user to input phone numbers anytime.

Since the SIM card records the personal information and data related to the mobile phone user, a mobile phone can carry out the authentication and encryption according to these information and data. If a user moves to a new area to dial or receive a call, the calling exchanger requires an authentication to confirm whether or not the user is an authorized user. Then, the SIM card and the calling exchange simultaneously use an authentication algorithm for computing the authentication key and an 8-digit bundled number. The SIM card is authenticated if the computing results are the same, otherwise the SIM card is rejected, and the user cannot make a call. Further, the use of the SIM card can effectively prevent unauthorized use or wiretap of the call. To protect a mobile phone from an unauthorized use, each SIM card can have a password (PIN code) set by users.

Further, the present Personal Handy-phone System (PHS) mobile phone does not adopt the technology of separating the SIM card and the mobile phone, but it directly uses a private system coding program to write a private system identification (PSID) into the memory of a PHS mobile phone, and such process of writing the PSID into the memory of a PHS mobile phone is generally called "Writing Code" because the technology has a lower entry. The process of obtaining the PSID by the private system coding program is generally called "Reading Code" or a private system coding program is used to remove the PSID which is generally called "Removing Code", so that the telephone number of the PHS mobile phone can be reinstalled. If a user's mobile phone is stolen or lost, other people can then own and use the mobile phone after the code is "written" and "read", and thus damaging the rights of the PHS mobile phone user.

If a GSM mobile phone is stolen or lost and the application of stopping the use of SIM card is not filed yet, then others can directly use the stolen mobile phone, and the user has to pay a large amount of telephone bill. After the SIM card is changed, the GSM mobile phone can also be used. Alternatively, the mobile phone is sold as a second-hand item. Any person who has the stolen or missing PHS mobile phone can "remove code" and sell the stolen or lost PHS mobile phone, or owns it after removing code and then writing code. Therefore, regardless of the system of the mobile phone, it is not easy to recover a stolen or lost mobile phone and cannot effectively prevent unauthorized use of the stolen or lost phone.

SUMMARY OF THE INVENTION

In view of the foregoing shortcomings of the prior arts, the inventor of the present invention conducted extensive researches and experiments, and finally designed a system for preventing unauthorized use of a mobile phone in accordance with the present invention.

Therefore, it is a primary objective of the present invention to prevent a person who illegally obtains a stolen or lost mobile phone from getting a correct identifying data produced by a radio frequency identification component and from decompiling the identifying data, so that the mobile phone cannot be used. Besides, the invention can prevent any unauthorized people to obtain the information stored in the mobile phone.

The above and other objects, features and advantages of the present invention will become apparent from the following detailed description taken with the accompanying drawings.

DETAILED DESCRIPTION OF THE PREFERRED EMBODIMENTS

Figure 1:
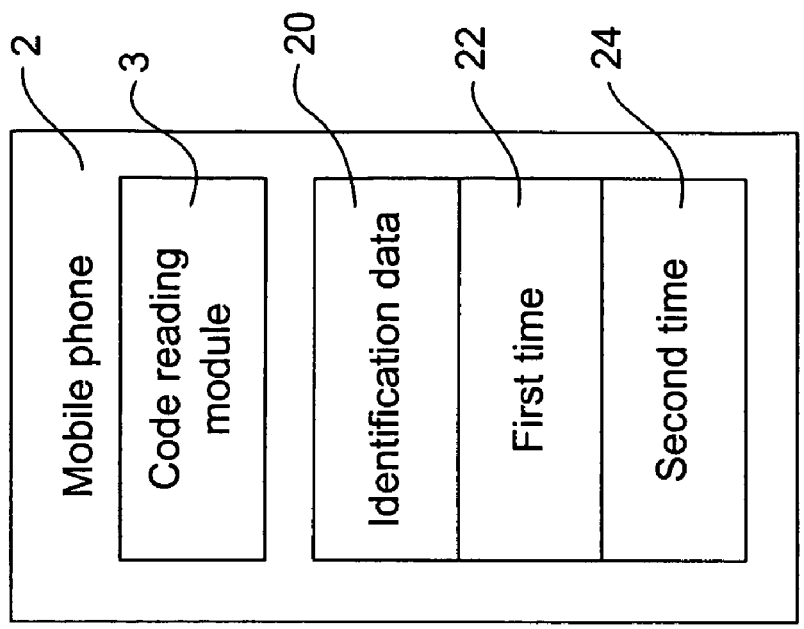
FIG. 1 is a schematic view of the structure of the present invention.
Figure 1:
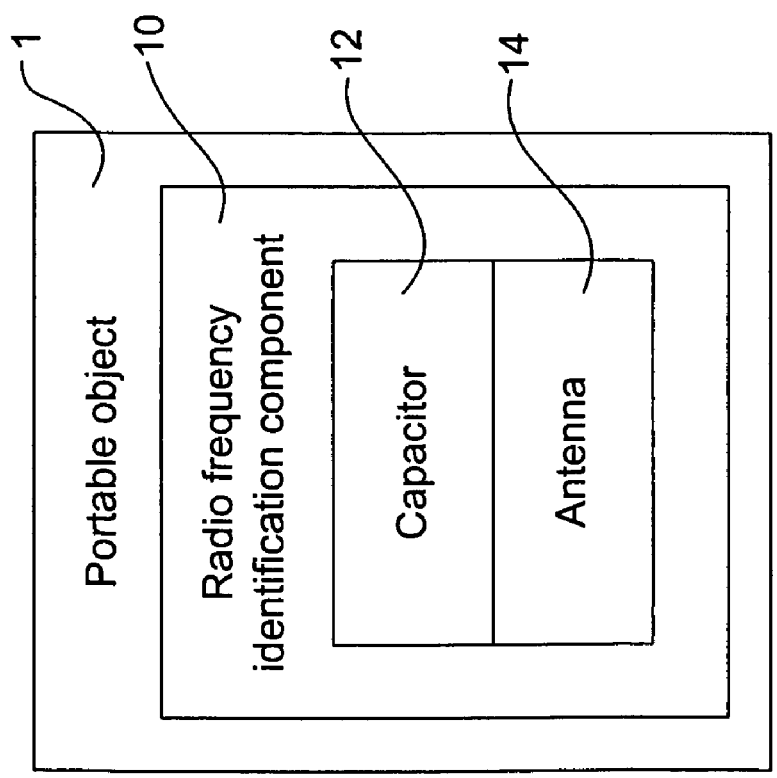
Figure 2:
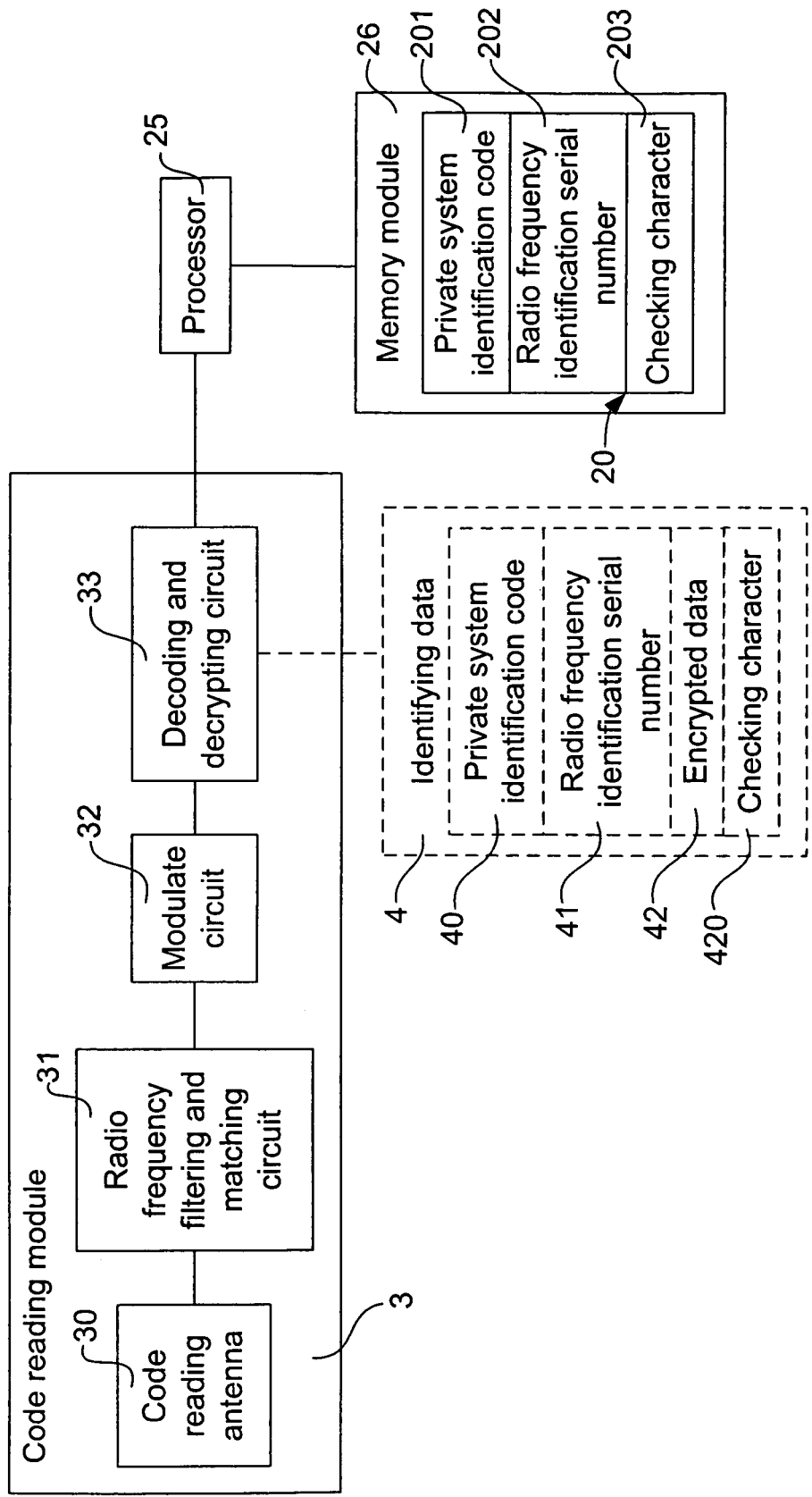
FIG. 2 is a schematic view of the connection between a decoding module and a processor according to the present invention.

Referring to FIG. 1, a system for preventing unauthorized use of a mobile phone comprises a portable object (such as a ring or a necklace, etc) having a Radio Frequency Identification (RFID) component 10 installed therein and a mobile phone 2 installed with a decoding module 3 and an identification data 20, such that after the mobile phone 2 is turned on, the decoding module 3 sends out a radio signal. By that time, if the radio frequency identification component 10 is located in an effective range for receiving the radio signals transmitted by the decoding module 3, then the radio frequency identification component 10 will send out an identifying data 4 (as shown in FIG. 2). After the decoding module 3 has received the identifying data, the decoding module 3 will decode the identifying data 4. The decoded identifying data 4 must comply with the identification data 20 before the mobile phone 2 can be used. Therefore, after the mobile phone 2 is lost, the mobile phone 2 cannot be used without the portable object 1, and thus the invention can prevent the mobile phone from being used without authorization or after being illegally taken away.

Since the invention only requires the identification for one time within the time from turning on the mobile phone 2 to turning off the mobile phone 2, a mobile phone 2 still can be used by unauthorized people if the mobile phone 2 is lost within an idle time. In order to prevent the mobile phone 2 from being used by unauthorized people in the idle time, in a preferred embodiment of the present invention, before the mobile phone 2 dials a phone number, the mobile phone 2 will carry out the step of sending out radio signals by the decoding module 3 and the process followed thereto. After the mobile phone 2 determines that the identifying data 4 matches with the identification data 20, the mobile phone 2 can then dial the phone number out, or else it cannot make a phone call. Besides, before the identification after the mobile phone 2 is turned on, the identification data 4 can be verified for dialing a phone call each time, so as to prevent unauthorized use of the mobile phone 2.

Figure 3:
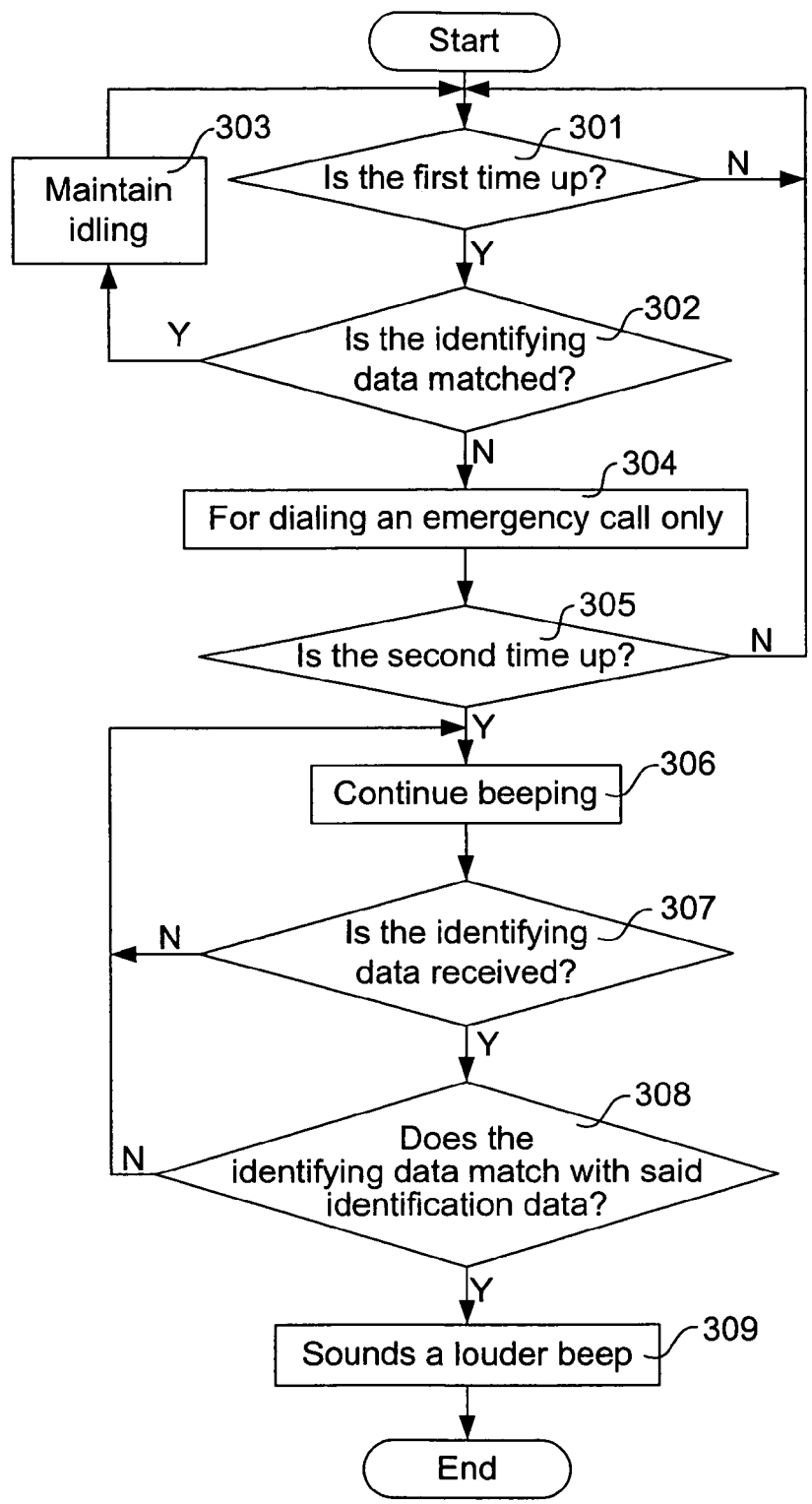
FIG. 3 is a flow chart of the present invention.

In additional, in order for a user to quickly find and locate the mobile phone 2 when the user does not carry the mobile phone 2 with him/her and forgets where the mobile phone is placed, a first time 22 and a second time 24 are set in the mobile phone 2 in this embodiment, as referring to FIGS. 1 and 2, wherein the second time 24 is longer than the first time 22. After the first time 22 of the mobile phone 2 is reached, the decoding module 3 will carry out the step of sending out radio signals by the decoding module 3 and the process followed thereto. After the mobile phone 2 reaches the second time 24, the mobile phone 2 will beep. Referring to FIG. 3, the mobile phone 2 carries out the following procedure within its idle time:

Step (301): Determine whether or not the first time 22 is reached; if yes, go to Step (301);

Step (302): The mobile phone 2 carries out the step of sending out radio signals by the decoding module 3 and the process followed thereto. The mobile phone 2 determines whether or not the identifying data 4 matches with the identification data 20; if yes, go to the next step, or else go to Step (304);

Step (303): The mobile phone 2 continues idling, and go back to Step (301);

Step (304): The mobile phone 2 determines that the identifying data 4 does not match with the identification data 20, and then allows only dial emergency calls;

Step (305): Determine whether or not the second time 24 is reached; if yes, go to the next step, or else go to Step (301);

Step (306): The mobile phone 2 starts a serial beeping;

Step (307): Determine whether or not the identifying data 4 is received; if yes, go to the next step, or else go to Step (306);

Step (308): Determine whether or not the identifying data 4 matches with the identification data 20 again; if yes, go to the next step, or else go back to Step (306); and Step (309): The mobile phone 2 sounds a louder beep.

In view of the above procedure, the mobile phone 2 carries out its identification periodically during its idle time, in addition to the time of turning on the phone and making a call. It also checks whether or not the identification data is correct for dialing a call each time, and thus can prevent unauthorized uses. The mobile phone 2 will beep to facilitate locating the mobile phone 2, if the mobile phone 2 has not received the identifying data 4 for a long time.

Figure 4:
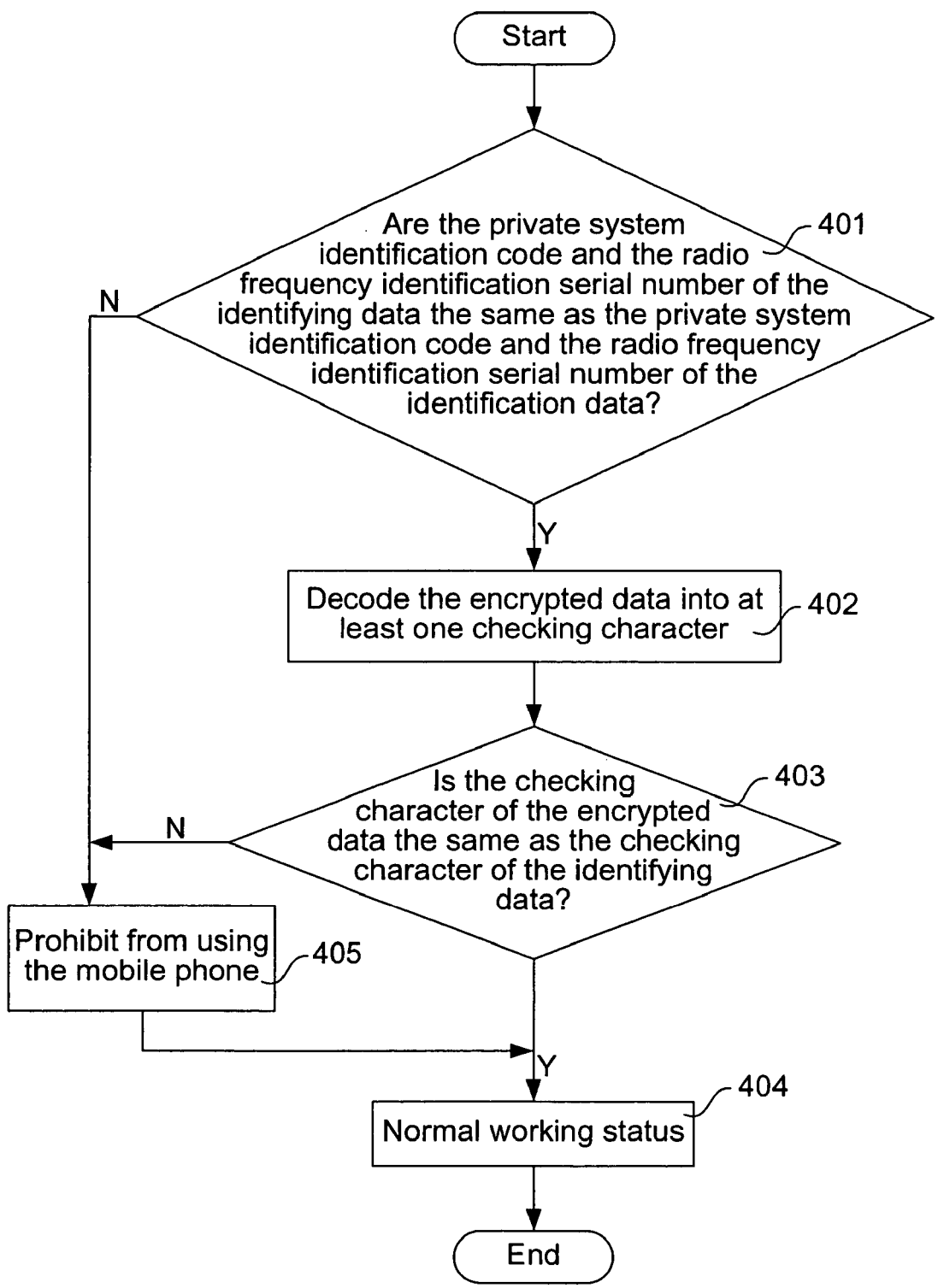
FIG. 4 is another flow chart of the present invention.

Referring to FIG. 2 again for the embodiments, the identification data 20 includes a private system identification (PSID) 201 of the mobile phone 2, a radio frequency identification serial number 202, and at least one checking character 203. After the identifying data 4 is decrypted by the decoding module 3, at least a private system identification (PSID) code 40, a radio frequency identification serial number 41 and an encrypted data 42 are included. The encrypted data 42 is decoded by the decoding module 3 into at least one checking character 420, such that after the decoding module 3 decrypts the identifying data 4 as shown in FIG. 4, the mobile phone 2 carries out the following procedure:

Step (401): Determine whether or not the private system identification (PSID) 40 and the radio frequency identification serial number 41 of the decrypted identifying data 4 are the same as the private system identification (PSID) code 201 and the radio frequency identification serial number 202 of the identification data 20; if yes, go to the next step, or else go to Step (405);

Step (402): The decoding module 3 decrypts the encrypted data 42 into at least one checking character 420;

Step (403): Determine whether or not the checking character 420 is the same as the checking character 203 of the identification data 20; if yes, go to the next step, or else go to Step (405);

Step (404): The mobile phone 2 proceeds with the normal working status;

Step (405): Prohibit the use of all paid functions of the mobile phone 2 and lock all personal data (such as directory, notepad, and calendar, etc) of the mobile phone 2 and show an error message.

From the above description, the private system identification code 201 of the identification data 20, the radio frequency identification serial number 202 and the checking character 203 of the mobile phone 2 must be completely correct before the mobile phone 2 can be used. Therefore, the identification data 20 cannot be cracked easily, and thus it can effectively prevent unauthorized use of the mobile phone 2.

Referring to FIG. 2 for the embodiments again, the decoding module 3 includes a code reading antenna 30, a radio frequency filtering and matching circuit 31, a demodulate circuit 32 and a decoding and decrypting circuit 33. The decoding and decrypting circuit 33 is connected to a processor 25 and the demodulate circuit 32 of the mobile phone 2 respectively. The processor 25 is connected to a memory module 26, and the identification data 20 is stored in the memory module 26. The radio frequency filtering and matching circuit 31 is connected to the code reading antenna 30 and the modulate circuit 32 respectively, such that after the mobile phone 2 is turned on, while the mobile phone 2 is idled, or when a call is dialed, the mobile phone 2 can use the radio frequency filtering and matching circuit 31, modulate circuit 32 and decrypt circuit 33 to produce radio signals, and the radio signals are sent out by the code reading antenna 30. After the radio frequency identification component 10 receives the radio signals, the radio frequency identification component 10 charges a capacitor 12 thereof in order to produce the identifying data 4 and then send the identifying data 4 out to the mobile phone through the antenna 14.

Figure 5:
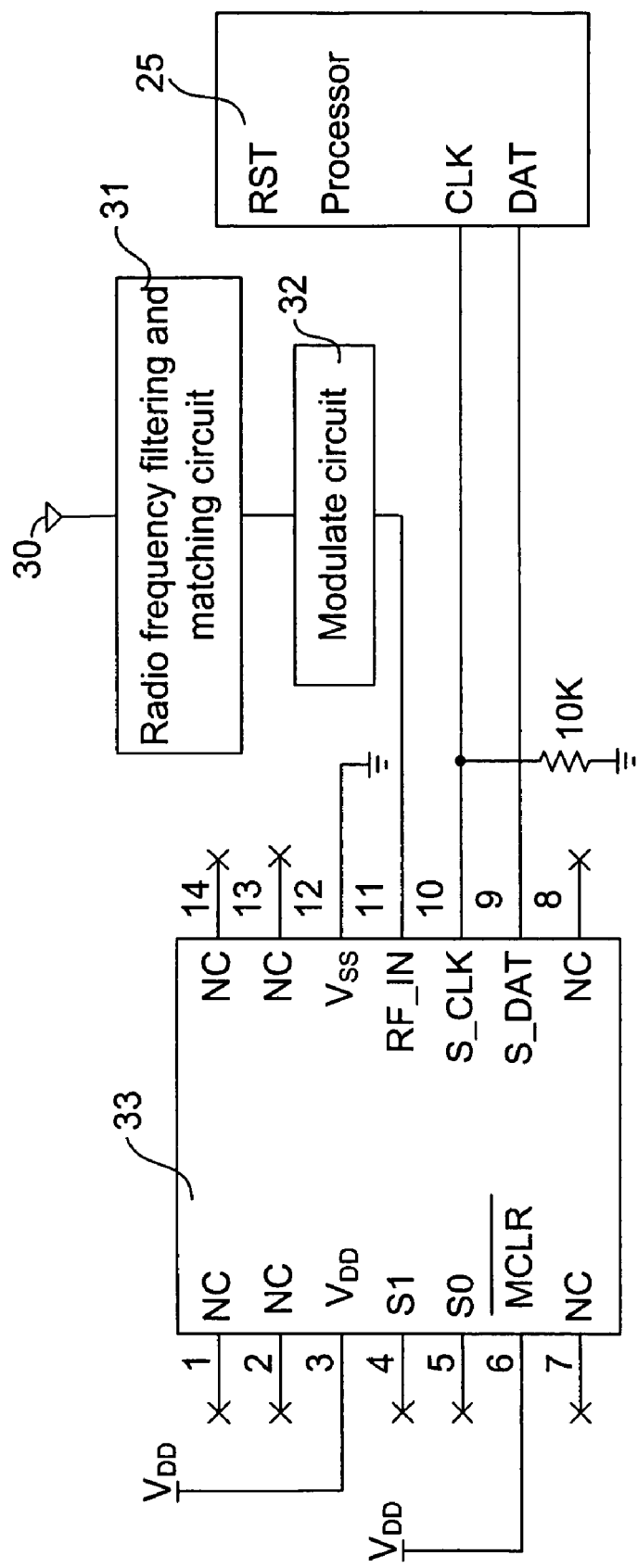
FIG. 5 is a schematic view of connecting a decoder chip and a processor according to the present invention.

Referring FIG. 5, the decoding and decrypting circuit 33 of the foregoing embodiment is a decoder chip, and the decoder chip connects the timing pin (S_CLK) to the clock pin (CLK) of the processor 25, and the data pin (S_DAT) of the decoder chip is connected to the data pin (DAT) of the processor 25 for sending the decoded data to the processor 25. Further, the decoder chip connects the radio frequency signal input pin (RF_IN) to the modulate circuit 32, so that the signal received by the code reading antenna 30 is filtered by the radio frequency filtering and matching circuit 31 and then sent to the modulate circuit 32 to modulate the signal. The signal is then sent from the module circuit 32 to the decoder chip through the radio frequency signal input pin (RF_IN) for decoding.

In the present invention, the portable object 1 is a ring, and the radio frequency identification component 10 is installed in the ring, and the antenna of the radio frequency identification component 10 is installed on an external side or both edges of the ring. The identifying data 4 produced by the radio frequency identification component 10 corresponds to the mobile phone 2 only, and thus it is necessary to wear the ring before using the mobile phone 2. It is preferably to use the hand that wears the ring to dial a call from the mobile phone 2, so as to make sure the first priority of reading the identifying data 4 correctly, preventing interferences, saving power and maintaining confidentiality. Further, a user may wear the ring when it is inconvenient for the user to carry the mobile phone 2 (while taking a shower or playing a soccer game), so as to prevent unauthorized use of the mobile phone 2.

While the invention herein disclosed has been described by means of specific embodiments, numerous modifications and variations could be made thereto by those skilled in the art without departing from the scope and spirit of the invention set forth in the claims.

What is claimed is:

1. A system for preventing unauthorized use of a mobile phone, comprising a portable object having a radio frequency identification component installed therein and said mobile phone installed with a decoding module and an identification data, such that after said mobile phone is turned on, said radio frequency identification component and said mobile phone carry out an authorizing process including:

enabling signal said decoding module by the mobile phone to send out a radio signal when a phone number is being dialed through the mobile phone;

enabling said radio frequency identification component to issue an identifying data when said radio frequency identification component is located in an effective region for receiving said radio signal and receives said radio signal; enabling said decoding module by said mobile phone to decode said identifying data when said mobile phone receives said identifying data; and enabling said mobile phone to dial said phone number out and be used normally when said mobile phone determines that said identifying data decoded by said decoding module matches with said identification data installed in said mobile phone, wherein said identification data comprises a private system identification code and a radio frequency identification serial number and at least one checking character of said mobile phone, after said identifying data is decrypted by said decoding module, at least a private system identification code, a radio frequency identification serial number and an encrypted data corresponding to said mobile phone are includes, and said encrypted data is decoded by a decoder of said decoding module into at least one checking character, such that after said decoding module completes decrypting said identifying data, said mobile phone carries out the steps of:

determining whether or not said private system identification code and said radio frequency serial number of said decrypted identifying data are the same as said private system identification code and said radio frequency serial number of said identification data;

if yes, then decoding said encrypted data into at least one checking character by said decoding module through using said decoder;

determining whether or not said checking character of said encrypted data after being decoded is the same as said checking character of said identification data; and if yes, proceeding with normal operating status.

2. The system for preventing unauthorized use of a mobile phone of claim 1, wherein a first time and a second time are set in said mobile phone, said first time is longer than said second time and, after reaching said first time, said mobile phone sends out said radio signal, and said mobile phone beeps when reaching said second time, such that said mobile phone within idle time carries out the steps of:

determining whether or not said first time is reached;

sending out said radio signal when said first time is reached, and then determining whether or not said identifying data matches with said identification data;

dialing out an emergency call when said identifying data mismatches said identification data;

determining whether or not said second time is reached;

starting a serial beeping when said second time is reached;

determine whether or not said identifying data is received;

determining whether or not said identifying data matches with said identification data when said identifying data is received; and sounding a louder beep when said identifying data mismatches said identification data.

3. The system for preventing unauthorized use of a mobile phone of claim 2, wherein after said first time is determined to be reached and said identifying data matches with said identification data, said mobile phone continues idling and then carries out said step of determining whether or not said first time is reached.

4. The system for preventing unauthorized use of a mobile phone of claim 2, wherein said identifying data is not received after said second time is determined to be reached, said mobile phone continues beeping.

5. The system for preventing unauthorized use of a mobile phone of claim 1, wherein if said private system identification code and said radio frequency serial number of said decrypted identifying data are different from said private system identification code and said radio frequency serial number of said identification data, then said mobile phone prohibits a user from using all paid functions and locks all personal data in said mobile phone, and then displays an error message.

6. The system for preventing unauthorized use of a mobile phone of claim 1, wherein if said checking character of said decrypted data is the same as said checking character of said identification data, then said mobile phone prohibits a user from using all paid functions and locks all personal data in said mobile phone, and then displays an error message.

7. The system for preventing unauthorized use of a mobile phone of claim 1, wherein said decoding module comprises:
- a code reading antenna, for receiving an identifying data from said radio frequency identification component;
- a radio frequency filtering and matching circuit, coupled with said code reading antenna and carrying out a filtering and matching process for said identifying data;
- a modulate circuit, coupled with said radio frequency filtering and matching circuit and carrying out a filtering and matching process for said identifying data; and
- a decoding and decrypting circuit, coupled to said processor and said modulate circuit of said mobile phone, and said processor being coupled to a memory module, and said identification data being stored in said memory module;

thereby, said mobile phone can use said radio frequency filtering and matching circuit, said modulate circuit, and said decoding and decrypting circuit to produce said radio signal, and said code reading antenna sends out said radio signal and said radio frequency identification component receives said radio signal, and a capacitor is installed in said radio frequency identification component for charging, and said radio frequency identification component produces said identifying data to be sent to said mobile phone through an antenna of said radio frequency identification component.

8. The system for preventing unauthorized use of a mobile phone of claim 7, wherein said decoding and decrypting circuit is a decoder chip, and said decoder chip connects a timing pin with a clock pin of said processor and a data pin of said decoder chip with said data pin for sending a decoded data to said processor, and said decoder chip further connects a radio frequency signal input pin with said modulate circuit, such that said signal received by said code reading antenna is filtered by said radio frequency filtering and matching circuit and then passed to said module circuit for a modulation, and then sent to said decoder chip through said radio frequency input pin for decoding.

9. The system for preventing unauthorized use of a mobile phone of claim 1, wherein said portable object is a ring, and said radio frequency identification component is installed in said ring, and said antenna of said radio frequency identification component is installed at an external side or on both edges of said ring, and said identifying data produced by said radio frequency identification component corresponds to said mobile phone only.

\* \* \* \* \*

UNITED STATES PATENT AND TRADEMARK OFFICE
CERTIFICATE OF CORRECTION

| | | |
|---|---|---|
| PATENT NO. | : 7,623,845 B2 | Page 1 of 1 |
| APPLICATION NO. | : 11/133387 | |
| DATED | : November 24, 2009 | |
| INVENTOR(S) | : Lai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1223 days.

Signed and Sealed this

Fourteenth Day of December, 2010

David J. Kappos
*Director of the United States Patent and Trademark Office*